G. DOUHET & E. ZOLLINGER.
PHOTOGRAPHIC APPARATUS FOR USE IN AERIAL NAVIGATION.
APPLICATION FILED SEPT. 3, 1914.

1,200,819.

Patented Oct. 10, 1916.
6 SHEETS—SHEET 1.

Witnesses:
B. Dommers
E. Leckert

Inventors:
Giulio Douhet
Ernesto Zollinger
By [signature]
atty

G. DOUHET & E. ZOLLINGER.
PHOTOGRAPHIC APPARATUS FOR USE IN AERIAL NAVIGATION.
APPLICATION FILED SEPT. 3, 1914.

1,200,819.

Patented Oct. 10, 1916.
6 SHEETS—SHEET 2.

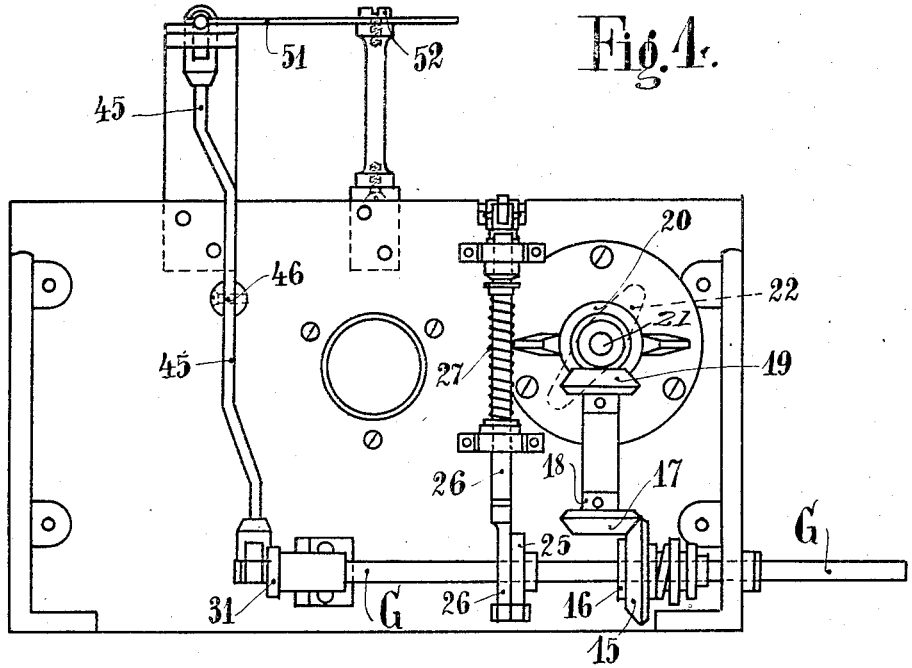
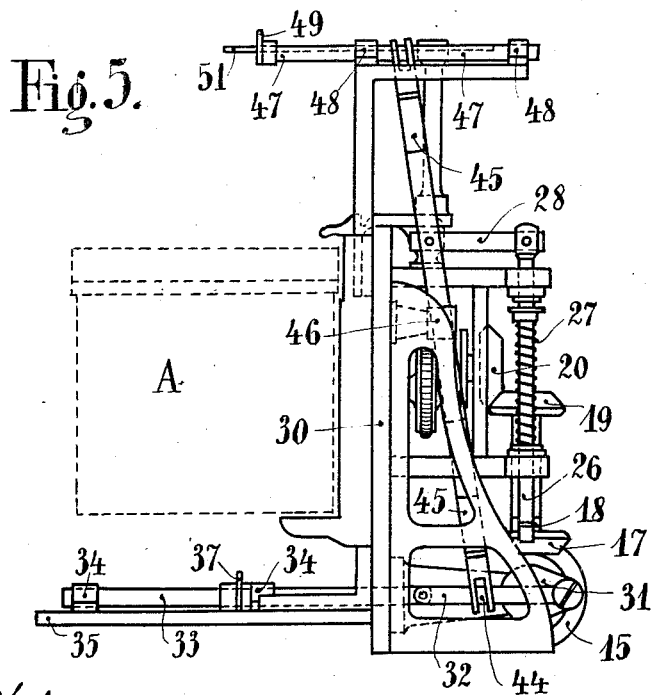
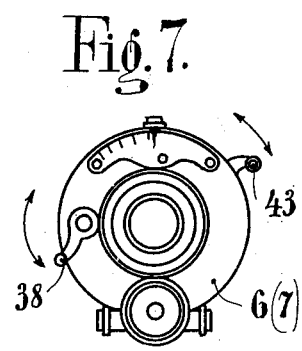

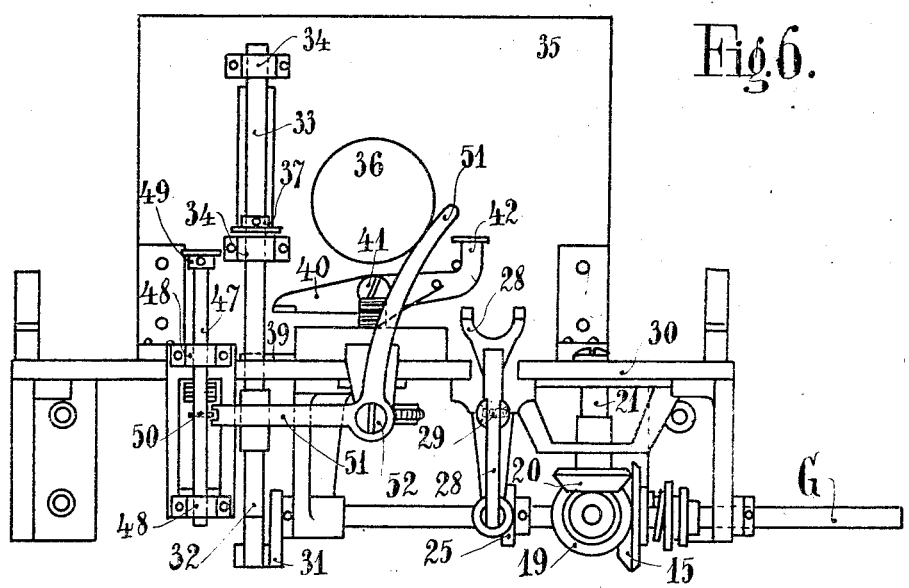
Fig. 6.
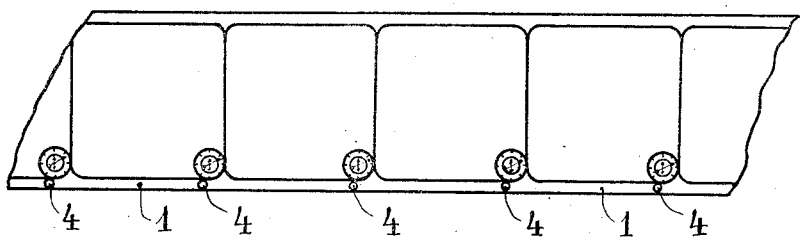
Fig. 8.
Fig. 9.   Fig. 10.   Fig. 11.
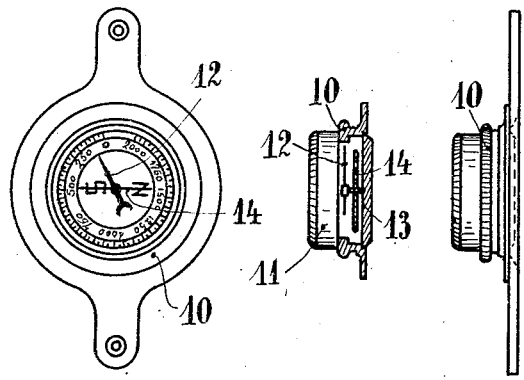

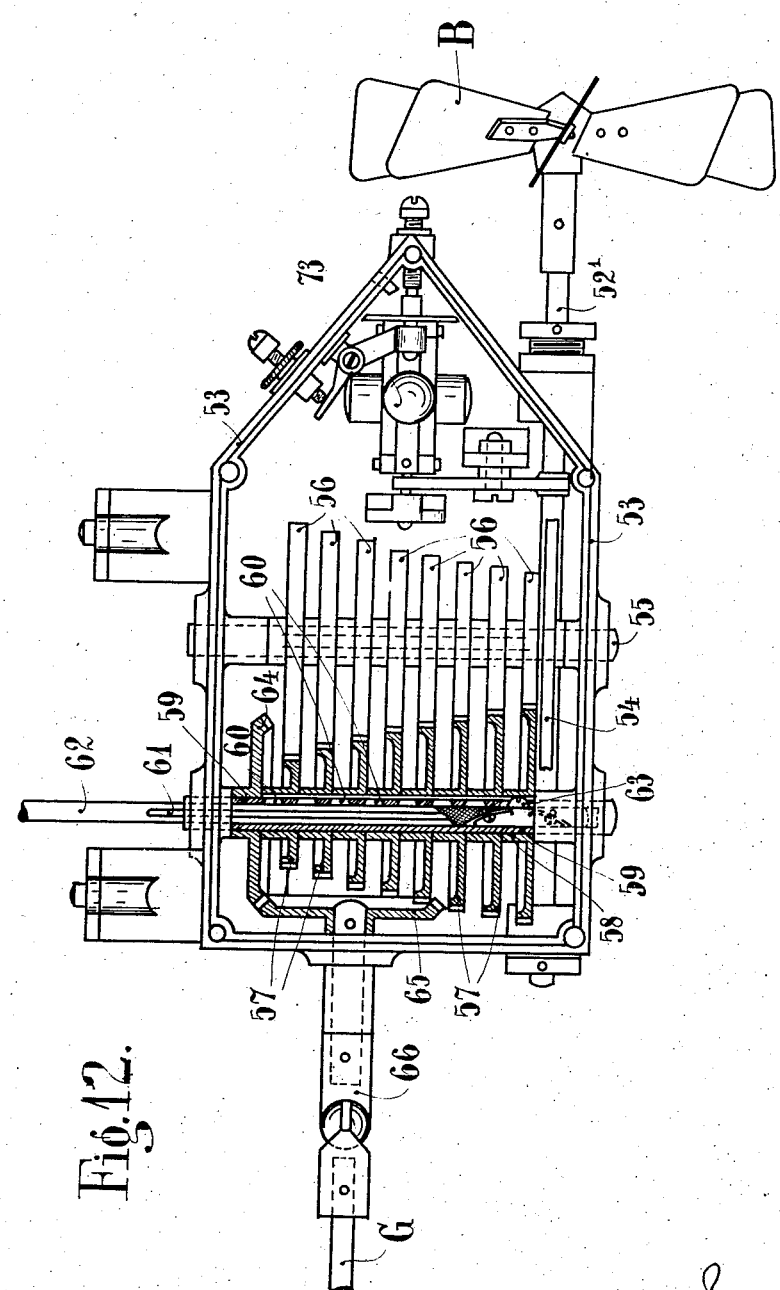

G. DOUHET & E. ZOLLINGER.
PHOTOGRAPHIC APPARATUS FOR USE IN AERIAL NAVIGATION.
APPLICATION FILED SEPT. 3, 1914.
1,200,819.
Patented Oct. 10, 1916.
6 SHEETS—SHEET 6.
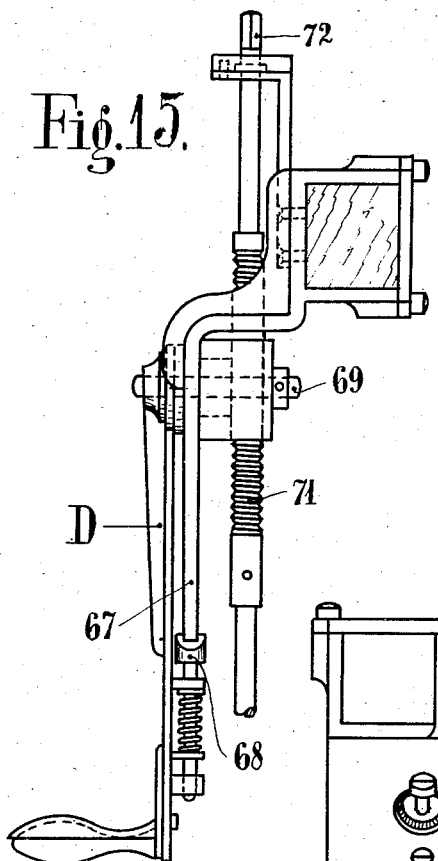
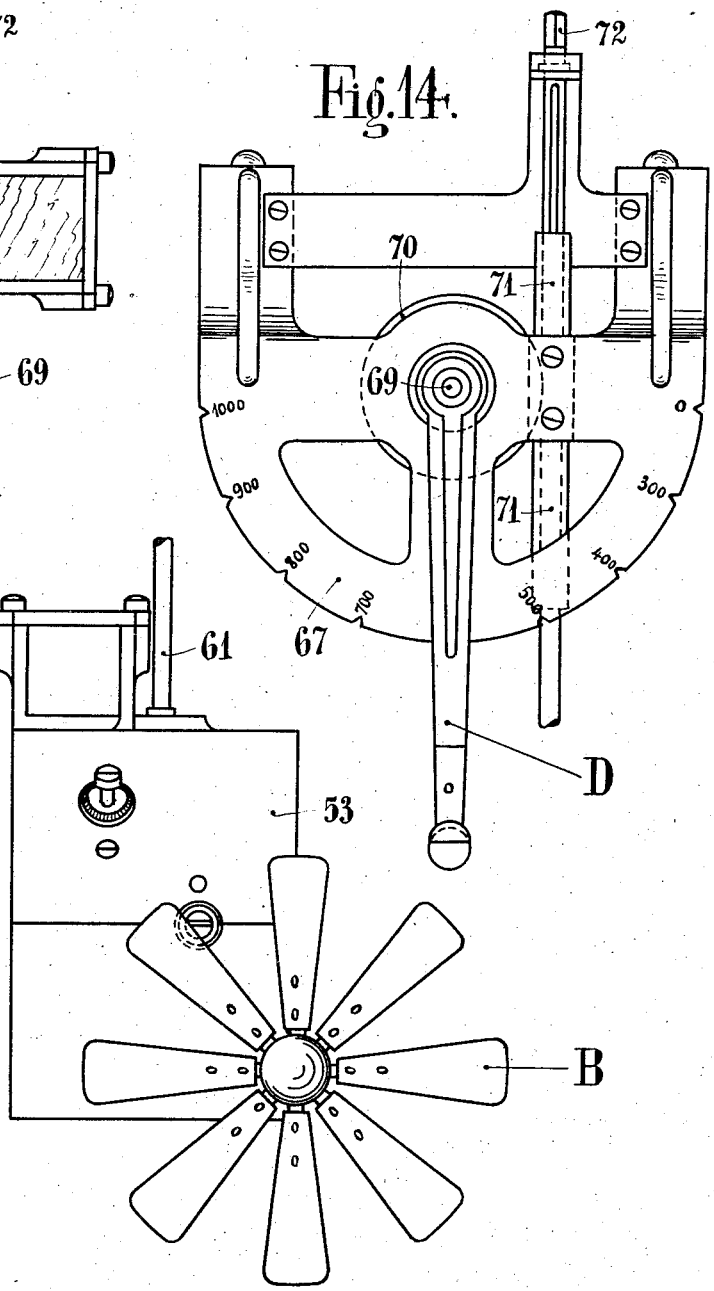

UNITED STATES PATENT OFFICE.

GIULIO DOUHET AND ERNESTO ZOLLINGER, OF TURIN, ITALY.

PHOTOGRAPHIC APPARATUS FOR USE IN AERIAL NAVIGATION.

1,200,819.  Specification of Letters Patent.  Patented Oct. 10, 1916.

Application filed September 3, 1914. Serial No. 860,083.

*To all whom it may concern:*

Be it known that we, GIULIO DOUHET, lieutenant-colonel, a subject of the King of Italy, and ERNESTO ZOLLINGER, civil engineer, a citizen of Switzerland, both of Turin, in the Kingdom of Italy, have invented certain new and useful Improvements in Photographic Apparatus for Use in Aerial Navigation; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to a photographic apparatus for aeroplanes, dirigible airships and the like machines for aerial navigation, by means of which it is possible to photograph automatically upon a continuous film, the ground flown over by the aeroplane, and moreover register for each successive plate, the position and the corresponding height of the aeroplane.

In the accompanying drawings is shown diagrammatically a form of the apparatus embodying the invention and by way of example, a constructional form of said apparatus.

Figure 1:
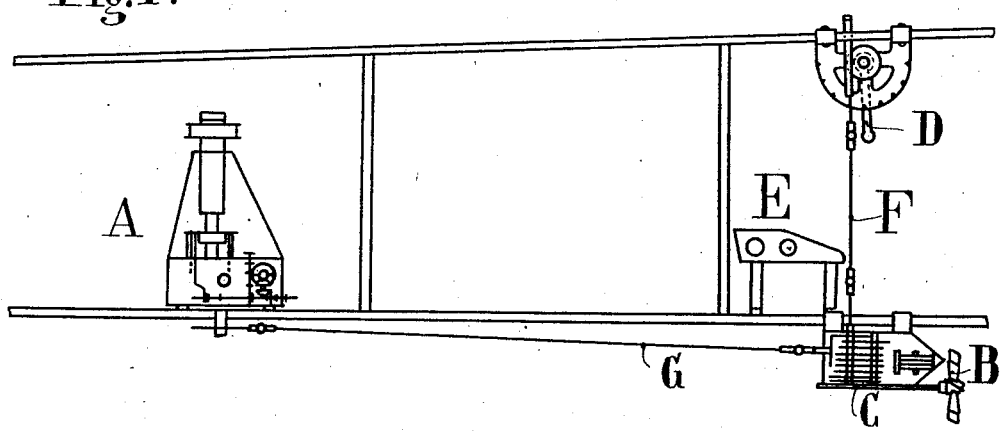
Figure 2:
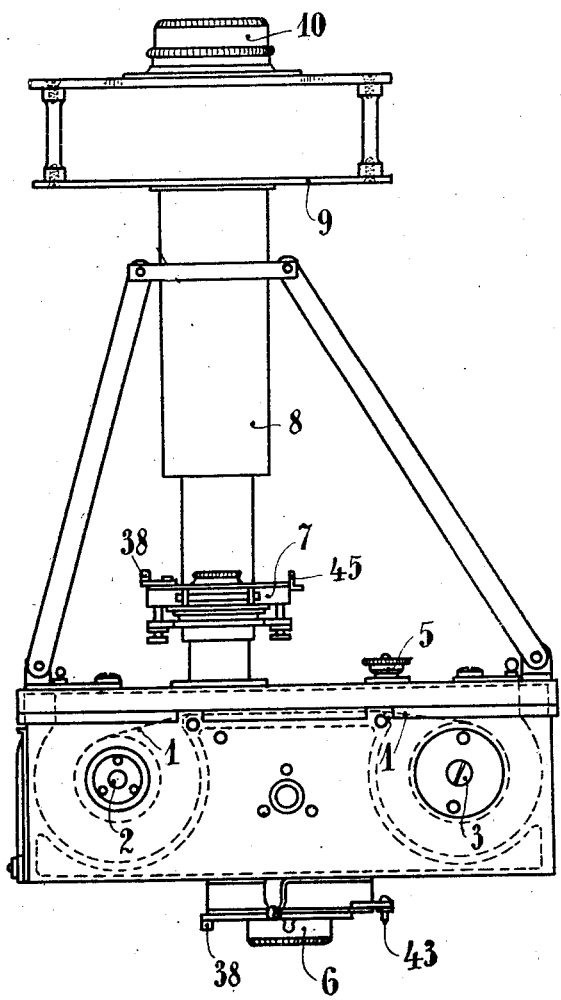
Figure 3:
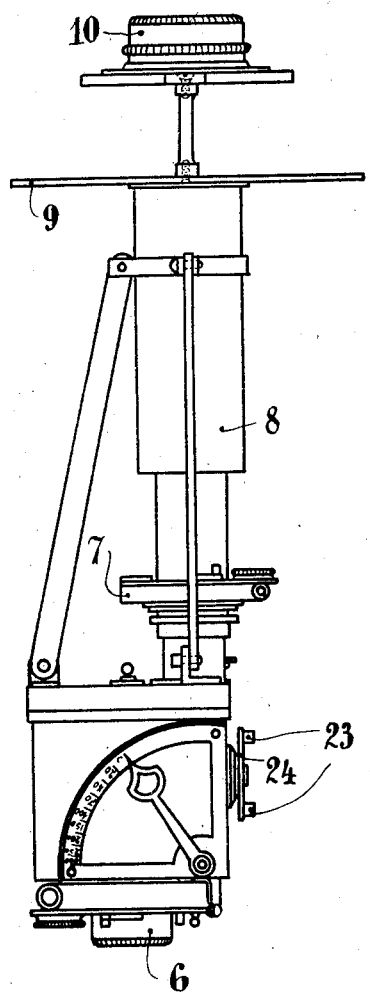

Figure 1 is a lateral view of the device mounted upon the chassis of the aeroplane; Figs. 2 and 3 are a front elevation and a lateral elevation, respectively, of the film camera with its two objectives; Figs. 4, 5 and 6 are a front elevation, a lateral elevation and a plan, respectively, of the support of the machine with device controlling the latter; Fig. 7 is a front elevation of one of the objectives; Fig. 8 is a plan of a portion of the film; Figs. 9, 10 and 11 are a plan, an axial section and a lateral view, respectively, of the device comprising in a single body the barometer and the magnetic compass. Figs. 12 and 13 are a plan partly in section and a lateral elevation, respectively, of the change speed gearing. Figs. 14 and 15 are a plan and a lateral elevation, respectively of the means for controlling the change speed gearings.

In the constructional form shown in Fig. 1 the whole of the apparatus is mounted on the chassis of an aeroplane. The camera A, (Figs. 2 and 3) has a compass and a barometer on its top; the feeding of the film and tripping of the shutter of both objectives is controlled automatically by means of the screw B actuated by the current of air produced either by the engine screw or the aeroplane itself, owing to the speed of the latter. The change speed gearing C (Figs. 12 and 13) is controlled by the lever D, situated within reach of the aviator from the seat E, which lever is connected by an articulated shaft F with said gearing and the latter is connected with camera controlling means by the articulated shaft G.

In the present apparatus it is advisable to use a camera, comprising two lateral cylindrical chambers (Fig. 2) in which the film rolls are provided, and a central dark chamber, at the back of which the film —1— is caused to pass. The film —1— is rolled upon a drum mounted on the axis —2— and is wound on another drum keyed on the axis —3— in proportion as photographs are taken.

The film is formed with orifices —4— (Fig. 8) the spacing of which corresponds to the distance between two successive photographs on the film; the orifices —4— are successively engaged by the stop pin —5—. In addition to the normal objective —6—, the camera is provided with a second objective —7— directed upwardly. The latter is also provided with a protecting tube —8— provided at its upper end with a reflector —9— illuminating the dial of the barometer and compass device —10— (Figs. 9, 10 and 11). The disposition of the parts is such that for each photograph obtained, the shutters of both objectives are tripped simultaneously; thus by means of the lower objective the ground below will be photographed and in a corner (Fig. 8) by means of the upper objective the dial of the barometer and the compass will be photographed showing the instantaneous position of the pointer and the arrow. Suitable screens (not shown) are used preventing the penetration of luminous rays on one side of the film through an objective, thus damaging the picture formed by the luminous rays coming from the other side of the film through the other objective.

The barometer and compass device comprises an aneroid barometer —11— provided with an indicating arrow —12— and a cylinder —10— maintaining the protecting glass at a sufficient distance from the dial so as to permit of the passage of the axis —13— (carrying the magnetic needle —14—) pivoting in holes drilled in the glass and the axis of the arrow —12—; in view of the fact that the device operates with the arrow —12— of the barometer superposed to the needle —14— of the compass, the axis of the latter bears completely upon the glass thus permitting of the free movement of the barometer arrow.

The device for automatically controlling the shutters of both objectives and the film is constituted as follows: Upon the free end of the shaft —G— (Figs. 5 and 7) (which is caused to rotate in the afore-described manner by means of a screw actuated by the current of air produced either by the engine screw or the aeroplane itself owing to the speed of the latter) a clutch —16— is mounted (which may be of any type, for instance, a friction clutch) operating the toothed bevel gear —15— meshing with the bevel gear —17— mounted on the short shaft —18— carrying at its other end the bevel gear —19— meshing with the bevel gear —20— mounted on the short shaft —21—. Upon the central part of the latter (Fig. 4) the stopping member —22— is mounted, engaging with the stops —23— of the plate —24— (Fig. 3) integral with the drum mounted on the driving axis —3— for winding on the impressed film. The eccentric —25— mounted on the shaft —G— controls the vertical spindle —26— (held in suitable guiding members secured to the plate —30— supporting the whole controlling device and normally forced in an upward direction by the spring —27—) causing it to slide downward at each revolution of the shaft —G—. The upper end of the spindle —26— is pivotally connected with the lever —28— pivoting at —29—, the forked free end of which engages underneath the spring controlled button —5— of the camera.

While the fork of the lever —28— is depressed owing to the action of the eccentric —25— and does not raise the button —5—, the latter will remain engaging a hole of the film and the toothed gear —15— will remain stationary owing to this engagement; it is during this period that the shutters of both objectives will be tripped, a simultaneous photograph of the ground underneath and of the dial of the barometer and compass being then taken. When the said fork raises the button thus disengaging the film, the friction clutch —16— becomes operative and operating the gear —15— actuates the shaft —21— and the axis —3—; when the fork —28— will again be depressed the button —5— will slide upon the film until it will find another orifice formed in the film and will thus stop the latter. Thus a fresh portion of the film will be in front of the objectives, which will receive an impression by the tripping of the shutters in the before-described manner. This cycle will be continually repeated during the rotation of the shaft —G—.

The control for charging and tripping the two shutters is effected from the same shaft —G— by means of the eccentric —31— keyed thereupon, which through the medium of the rod —32— causes the rod —33— to reciprocate in the guides —34— secured to the supporting plate —35— in which a hole —36— is formed for the lower objective. The projection —37— of the rod —33— engages, during the forward travel of the latter, the button of the lever —38— of the shutter of the objective —6— (Figs. 2 and 7). The rod —33—, is, moreover provided with a pin —39— (Fig. 6) engaging with the lever —40— pivoting at —41— and operating, by means of its own projection —42—, the button of the lever —43— for tripping the shutter of the objective —6— immediately after it has been charged in the aforedescribed manner. The button or stop —44— of the rod —32— is engaged in the end of the lever —45— pivoted at —46— which with its other end reciprocates the rod —47— sliding in its guides —48—. This rod —47— operates through the medium of its own projection —49— the stop on the rod —38— for charging the shutter of the objective —7— (Figs. 3 and 4); the said rod —47— controls, moreover, through the medium of the pin —50— engaging in the end of the angular lever —51— pivoted at —52—, the stop —43— of the tripping lever for the said shutter which engages with the free end of the lever —51—. Thus at each revolution of the shaft —G— the displacement of the film through a distance corresponding to the length of the photograph and the tripping of the two shutters are successively obtained.

Since the field to be photographed increases as the apparatus attains a higher level it is advisable in order to avoid a wasting of the film, that each photograph should contain two portions as small as possible of the immediately preceding and following photographs. It is preferable instead of keying the driving screw —B— directly upon the shaft —G—, to interpose between the latter and the shaft —52'— carrying the said screw a change speed gearing permitting of a progressive decrease of the angular speed of the shaft —G— with respect to the progressive increase of the height. This change speed gearing may be of any known type, the drawings illustrate, however, by way of example, a change speed gearing particularly suitable for this purpose; the casing —53— is penetrated by the shaft —52'— carrying a worm engaging with the worm wheel —54— keyed on the shaft —55— upon which the gear wheels —56— having a progressively increasing diameter, are keyed. The latter engage with toothed gear wheels having diameters progressively decreasing mounted loosely upon the sleeve —59— parallel with the shaft —55—. Each of the hubs —58— of the gear wheels is formed with a longitudinal groove for the key, and the sleeve —59— is formed with openings —60— the number of which corresponds to that of the wheels —57—. The sleeve —59— comprises a small shaft —62— sliding axially but not capable of rotating with respect to the sleeve owing to the key —61—. The end of the said shaft —62— is formed with a spring controlled tooth —63— which when it penetrates one or the other of the openings —60— and the corresponding grooves of the hubs, renders one of the wheels —57— stationary upon the shaft —62—.

The bevel gear —64— keyed upon the sleeve —59— and therefore integral with the shaft —62— engages with the gear —65— keyed upon the small shaft —66— connected through the medium of a Cardan joint with the shaft —G—. The axial displacement of the shaft —62— for operating the change speed gearing is operated by the lever —D— provided with a spring handle for disengaging the stop —68— engaging in the successive notches of the sector —67— corresponding to the speeds necessary for the various heights on the side of the said notches. The lever —D— is mounted upon the short shaft —69— upon which the gear wheel —70— is keyed engaging with the cylindrical rack —71— connected through the medium of universal joints and the intermediate shaft —F—, with the shaft —62— (Fig. 14).

The rack —71— can slide longitudinally; it is terminated at the top by a square head —72— upon which a handle can be mounted for the manual operation of the camera; to this end it is necessary to displace rearwardly the rack by zeroizing the lever —D—, i. e. until the spring controlled tooth —63— is out of engagement with all the gears —57—. The gear —64— will then transmit to the shaft —G— the rotation imparted by hand to the shaft —72—F—62. An inertia control —73— of a well known type controls the rotation of the shaft —52'—.

Instead of the change speed gearing —C— the blades of the driving screw propeller may be made movable by using any of the well known mechanical arrangements (for instance such as are used in connection with the screw propellers of boats, dirigible airships, etc.); it is thus possible to vary gradually the pitch (for instance by displacing said blades from 0° to 45°), whereby a gradual change of speed is obtained that can be used in lieu of any other similar device.

It will be understood that the shaft —G— may be actuated by the motor of the aeroplane or dirigible airship, or, particularly in case of balloons, by an electric or compressed air motor or any other motor preferably of small weight and capable of transmitting as uniformly as possible a rotary motion to the shaft —G—; for this purpose it will also be convenient to use a clockwork.

In the dial of the arrows —12— and —13—, the first arrow may be made movable by hand to bring it to show successively the relative height of the aeroplane or the like on the ground, which may be deduced for instance from a topographic plan. Finally the speed of rotation that must be transmitted to the shaft —G— (that produces directly the forward motion of the film and controls the two shutters) being a function of the speed of displacement of the apparatus and the height of the same on the ground, it will be possible to draw up a table giving the intervals between the trippings of the shutters. Such table will be the following for a photographic camera comprising, for instance, a field of 50m., at the height of 100m.

| Relative speed for 1″. | Height on the ground, in meters. | | | | | | | | | | | |
|---|---|---|---|---|---|---|---|---|---|---|---|---|
| | 100 | 200 | 300 | 400 | 500 | 600 | 700 | 800 | 900 | 1,000 | 1,100 | 1,200 |
| | Intervals between two trippings. | | | | | | | | | | | |
| m. 50 | 1″ | 2″ | 3″ | 4″ | 5″ | 6″ | 7″ | 8″ | 9″ | 10″ | 11″ | 12″ |
| m. 25 | 2″ | 4″ | 6″ | 8″ | 10″ | 12″ | 14″ | 16″ | 18″ | 20″ | 22″ | 24″ |
| m. 12.50 | 4″ | 8″ | 12″ | 16″ | 20″ | 24″ | 28″ | 32″ | 36″ | 40″ | 44″ | 48″ |
| m. 6.25 | 8″ | 16″ | 24″ | 32″ | 40″ | 48″ | 56″ | 64″ | 72″ | 80″ | 88″ | 96″ |
| m. 3.15 | 16″ | 32″ | 48″ | 64″ | 80″ | 96″ | 112″ | 128″ | 144″ | 160″ | 176″ | 192″ |

Assuming that the apparatus is provided with a change of 8 speeds (indicated by I, II, III, IV, V, VI, VII, VIII) corresponding for instance to the successive intervals of the above table: 10″, 20″, 30″, 40″, 60″, 80″, 120″, 160″, the following table will be established giving for each case the position to be taken for the change of speed and consequently that to be given on the dial of the driving lever —D—.

| Relative speed for 1″. | Height on the ground, in meters. | | | | | | | | | | | |
|---|---|---|---|---|---|---|---|---|---|---|---|---|
| | 100 | 200 | 300 | 400 | 500 | 600 | 700 | 800 | 900 | 1,000 | 1,100 | 1,200 |
| | Change of speed. | | | | | | | | | | | |
| m. 50 | | | | | | | | | | | | |
| m. 25 | | | | | | | | | | I | I | I |
| m. 12.50 | | | | | I | I | I | I | I | II | II | II |
| m. 6.25 | | I | II | III | II | II | II | III | III | IV | IV | IV |
| m. 3.15 | I | III | IV | V | IV | IV | IV | V | V | VI | VI | VI |
| | | | | | VI | VI | VI | VII | VII | VIII | VIII | VIII |

For the purpose of maintaining continuity when taking a panoramic view of the ground flown over, particularly during rapid ascents and descents and turnings, it will be advisable to mount the camera upon a Cardan suspension in order to maintain the optical axis of the objective always vertical.

What we claim is:

1. In a photographic apparatus for aero craft the combination with the camera body, its lens and film rolls, of a continuously operating shaft, means for automatically winding the film from one roll to the other driven by said shaft, and means controlled from said shaft to momentarily stop the film during its exposure and simultaneously stop the winding means.

2. In a photographic apparatus for air craft, the combination with the camera body, its lens and film rolls; of a continuously operating shaft, means operated by said shaft for engaging a single perforation adjacent the individual picture fields of the film to stop the film for exposure, and means actuated by said shaft to wind the film, and a clutch between said shaft and film winding means automatically controlled by tension on the film.

3. In a photographic apparatus for air craft, the combination with a camera body and film, a lens on each side of said film, and exposure mechanism for said lenses; of a continuously operated shaft, mechanism for actuating said film from said shaft, means controlled from said shaft to stop said film for exposure, and mechanism actuated from said shaft to simultaneously operate said exposure mechanism.

4. In a photographic apparatus for air craft, the combination with a camera having exposure mechanism and film feeding mechanism; of a continuously rotating member, means operated by the latter for actuating said mechanisms, and means to control the speed of said shaft to vary the interval between successive exposures in accordance with the height of the craft.

5. In a photographic apparatus for air craft, the combination with a camera having exposure mechanism and film feeding mechanism; of a continuously rotating member, means operated by the latter for actuating said mechanisms, and means to control the speed of said member in accordance with the speed of said craft.

6. In a photographic apparatus for air craft, the combination with a camera having exposure mechanism and film feeding mechanism; of a continuously rotating member, means operated by the latter for actuating said mechanisms, and means to control the speed of said member to vary the interval between successive exposures in accordance with the height of the craft and also in accordance with the speed of said craft.

7. In a photographic apparatus for air craft, the combination with a camera having exposure mechanism and film feeding mechanism; of a barometer and compass, an auxiliary lens having exposure mechanism and arranged to photograph said barometer and compass on said film simultaneously with the operation of the first mentioned exposure mechanism, a continuously operating element from which said mechanisms are operated and means to control the speed of said element and thereby all of said mechanisms in accordance with the height and speed of the craft.

In testimony that we claim the foregoing as our invention, we have signed our names in presence of two subscribing witnesses.

GIULIO DOUHET.
ERNESTO ZOLLINGER.

Witnesses:
FERRUCCIO JACOBECCI LEGEGUERE,
C. S. TEYLES.